United States Patent [19]
Björk et al.

[11] Patent Number: 6,084,862
[45] Date of Patent: Jul. 4, 2000

[54] TIME DISPERSION MEASUREMENT IN RADIO COMMUNICATIONS SYSTEMS

[75] Inventors: Peter Björk, Rosersberg; Linus Ericsson, Täby; Johan Sköld, Åkersberga, all of Sweden

[73] Assignee: Telefonaktiebolaget LM Ericsson, Stockholm, Sweden

[21] Appl. No.: 08/938,515

[22] Filed: Sep. 26, 1997

[51] Int. Cl.[7] .............................. H04B 3/20; H04B 17/00; H03D 1/24; H03D 1/00

[52] U.S. Cl. ..................... 370/292; 370/321; 455/67.6; 375/321; 375/340

[58] Field of Search ..................................... 370/292, 331, 370/332, 337, 252, 442, 350, 503, 508, 509, 510, 512, 514, 321; 455/63, 67.1, 67.3, 67.6, 504, 506; 375/231, 230, 340, 342, 348

[56] References Cited

U.S. PATENT DOCUMENTS

| | | |
|---|---|---|
| 5,136,616 | 8/1992 | Dent . |
| 5,251,237 | 10/1993 | Baier . |
| 5,297,169 | 3/1994 | Backstroöm et al. . |
| 5,319,677 | 6/1994 | Kim . |
| 5,373,507 | 12/1994 | Skold ........................................ 370/331 |
| 5,438,595 | 8/1995 | Cheng et al. ............................ 375/340 |

FOREIGN PATENT DOCUMENTS

| | | |
|---|---|---|
| 0295226A1 | 12/1988 | European Pat. Off. . |
| 0415897A1 | 3/1991 | European Pat. Off. . |
| 0 446 523 A2 | 9/1991 | European Pat. Off. . |
| WO 94/05100 | 3/1994 | WIPO . |
| WO 96/04738 | 2/1996 | WIPO . |
| WO 96/13910 | 5/1996 | WIPO . |

OTHER PUBLICATIONS

J.D. Parsons, et al., "Sounding Techniques for Wideband Mobile Radio Channels: A Review", IEE Proceedings–I, vol. 138, No. 5, Oct. 1991, pp. 437–446.

Jan–Erik Berg, et al., "Specular Reflections from High–Rise Buildings in 900 MHZ Cellular Systems", 41st IEEE Vehicular Technology Society Conference VTS '91, May 1991, pp. 1–6.

Simon Haykin, "Method of Least Squares", *Adaptive Filter Theory*, Prentice–Hall, ISBN 0–13–004052–5 025, 1986, Chapter 7, pp. 307–323.

*Primary Examiner*—Chi H. Pham
*Assistant Examiner*—Steven Nguyen
*Attorney, Agent, or Firm*—Burns, Doane, Swecker & Mathis, L.L.P.

[57] ABSTRACT

Time dispersion of a signal that has been received from a channel is measured by utilizing metrics to determine the energy inside an equalizer window and outside of the equalizer window. In one embodiment, the estimate of the energy outside the window is a difference between residual interference estimates. In another embodiment, the estimate of the energy outside the window is a difference between residual impulse response power estimates.

15 Claims, 9 Drawing Sheets

TIME DISPERSION MEASUREMENT IN RADIO COMMUNICATIONS SYSTEMS

BACKGROUND

The present invention relates to radio communications systems, and more particularly to techniques for measuring an amount of time dispersion associated with a received radio signal.

Dispersion is the process by which radiation is separated in accordance with some characteristic (e.g., frequency, wavelength, energy) into components which have different directions. It is well known that when a radio signal is transmitted, its dispersed energy components may individually reflect off of different objects in the radio environment, so that a number of energy components will take different paths to arrive at a receiver. Because the different paths are generally of different lengths, the reflected energy components arrive at the receiver at correspondingly different times. This phenomenon is called multipath propagation.

This multipath characteristic causes a transmitted radio pulse to undergo different gain and phase variations resulting in reception of a distorted pulse. Pulse distortion from the channel medium can cause, for example, interference between adjacent samples of the received signal resulting in a phenomenon known as intersymbol interference. Intersymbol interference can be viewed as a smearing of the transmitted pulse by the multi-path, causing overlap between successive pulses. Interference with a particular pulse can occur as a result of both past and future pulses, since the pulse is detected at the receiver after a mean path delay when the pulse is received with greatest strength. Portions of pulse energy from a past pulse that have experienced a greater than average delay may therefore interfere with a subsequent pulse, and portions of energy from a "future" pulse (i.e., a pulse that the radio receiver is not ready to detect) experiencing a less than average path delay may interfere with the present pulse being detected by the radio receiver.

As is known in the art, intersymbol interference may be greatly reduced using an adaptive equalizer. In one type of equalizer, for example, time-shifted versions of the received signal are combined with the received signal according to appropriate weights to cancel future and past interference. Such an equalizer may be constructed using a transverse filter including a tapped delay line. The appropriate weights, according to which delayed signal replicas are combined with the presently received signal, are derived during what is known as equalizer training. During equalizer training, a known sequences of symbols is transmitted and the output of the equalizer in response to the known sequence of symbols is compared to the known sequence itself. In an iterative process, an adoption algorithm optimized to minimize the difference between the detected symbol sequence and the actual symbol sequence sets the weights of the equalizer. If the weights of the equalizer are properly set, the error will be reduced to a minimum level and the equalizer will be said to have converged. If for some reason the weights are not properly set, the error may actually increase and the equalizer will be said to have diverged.

In another well-known type of equalizer, the Viterbi equalizer, a set of weights representing the impulse response of the communications channel is derived using a transverse filter in substantially the same manner as described above. Using the channel estimate, received pulses are detected according to the Viterbi algorithm to yield symbols of maximum likelihood given the channel estimate.

Measurement of time dispersion can, for example, be used in a receiver to find out what the source of interference is. That is, measurement of time dispersion can be used to distinguish between interference from reflected rays that arrive at the receiver at a time that puts them outside the equalizer window, and other types of interference including cochannel interference and adjacent channel interference.

A measurement of time dispersion, here expressed in dB, is the carrier over reflection (COR) value, defined as $$COR = 10 \cdot \log\left(\frac{E_i}{E_o}\right) \quad [dB] \tag{1}$$

where $E_i$ is the energy measured inside the equalizer window of length $T_1$ and $E_o$ is the energy outside the window, measured over the interval $T_2-T_1$ ($T_2>T_1$). These parameters are illustrated in FIG. 1, which is an exemplary graph of impulse response plotted as a function of time. The time intervals $T_1$ and $T_2$ should be specified as an integer number of modulation symbol intervals, $T_s$. In Europe's standard Global System for Mobile communication (GSM), for example, $T_s$ is 3.69 μs. The selection of values for $T_1$ and $T_2$ are not restricted, but higher values of $T_2$ would presumably give lower accuracy in time dispersion measurements.

One possible way of measuring the energy inside the $T_1$ and $T_2-T_1$ window is by correlation of the received signal with a known training sequence. The energy in the $T_1$ window and the energy in the $T_2-T_1$ window are each calculated by adding the energy of the correlation values inside the respective windows. The time dispersion is measured by comparing the energy in the $T_1$ window with the energy in the $T_2-T_1$ window. Known training sequences are specified to be included, for example, in bursts that may occur, for example, in time slots of time division multiple access (TDMA) frames that are broadcast in, accordance with the GSM standard. Correlation of the received signal with the known training sequence is already performed in existing systems in order to find the synchronization position, that is, the position of the equalizer window.

The above-described measurement technique seems straightforward, but a number of problems stand in the way of using this technique to obtain a COR estimate. In particular, if the training sequence is of limited length compared to the time dispersion at hand, the correlation signal is an accurate measure of time dispersion only when it is based on portions of the received signal that are close to the main part of the received energy, that is, within and close to the equalizer window. Further away, the correlation properties of the training sequence are not very good.

There are three primary reasons why a correlation measure cannot be used to estimate the time dispersion. These are:

1) Contributions to the correlation estimate of a tap from signal energy that is received in another tap, when the two taps are separated more than the span of the ideal part of the training sequence's autocorrelation function. In GSM, for example, the training sequence has ideal (white) autocorrelation properties up to a separation of five taps. Taps separated by more than that can, therefore, not be estimated independently without interfering with each other.

2) Contributions to the correlation estimate of a tap from correlation with received samples corresponding to bits outside of the training sequence (that are unknown). In the GSM example, when the training sequence is twenty-six bits long (normal burst), this error dominates when a tap is estimated that is separated more than fifteen taps from the main tap (i.e., the one with the most energy).

3) Received interference (e.g., noise, cochannel interference, adjacent channel interference, interference from user signal energy received outside the equalizer window, plus any other interference received) that contributes to channel estimation errors.

If the interference level and the channel characteristics within the equalizer window were known, it would be possible to calculate accurate estimates of the three effects above and to subtract them from the channel estimate. In practice, however, the interference level and channel characteristics are not known, but instead have to be estimated. These estimates will be distorted if there is time dispersion outside the equalizer window, which of course there is because this is what we are attempting to measure.

The errors in the channel estimate that is made from the correlation between the received signal and the known training sequence are too large to be ignored. Consequently, a good estimate of the impulse response and thereby the time dispersion is impossible to get this way.

It is therefore desirable to provide techniques and apparatus for making accurate measurements of time dispersion.

SUMMARY

In accordance with one aspect of the present invention, the foregoing and other objects are achieved in apparatus and methods of measuring time dispersion in a signal that has been received from a channel. In one aspect of the invention, time dispersion may be measured by generating a set of received samples from the received signal, wherein the set of received samples corresponds to a known training sequence. The known training sequence and the corresponding set of received samples are then utilized to generate one or more channel estimates. Then, for each of the one or more channel estimates, a corresponding residual energy metric is determined from the corresponding channel estimate, the known training sequence and the corresponding set of received samples. The one or more residual energy metrics are used to estimate received useful energy and reflection energy in the received signal. A measure of time dispersion in the signal that has been received from the channel may then be obtained by comparing the estimated received useful energy and the estimated reflection energy.

In another aspect of the invention, determining the corresponding residual energy metric for each of the one or more channel estimates includes generating one or more estimates of the received signal, wherein each of the estimates of the received signal corresponds to one of the one or more channel estimates. Then, a corresponding mean squared difference between the estimates of the received signal and the received signal is determined.

In still another aspect of the invention, each residual energy metric, $M_L$, may be determined in accordance with the following:

$$M_L = \frac{1}{N - 2L - 1} \sum_{n=L}^{N-1} |\hat{y}(n) - y(n)|^2$$

where $$\hat{y}(n) = \sum_{k=0}^{L} s(n-k)\hat{h}(k), \quad n = L, \ldots, N-1$$

and y(i) is an ith element of the set of received samples, N is the length of the known training sequence, s(i) is an ith element of the known training sequence, ĥ(i) is an ith element of the corresponding channel estimate, and L is the memory length of the corresponding channel estimate.

In yet another aspect of the invention, the estimated received useful energy, C, may be determined in accordance with the following equation:

$$C = E_{iLeq} - QM_{Leq},$$

where $$E_{iLeq} = \sum_{k=0}^{Leq} |\hat{h}(k)|^2$$

Leq is a predetermined memory length of one of the one or more channel estimates, and Q is a constant.

In an alternative embodiment, the estimated received useful energy, C, may be determined in accordance with the following equation:

$$C = E_{iLext} - \frac{(Leq + 1)Q}{Lext + 1} M_{Lext}$$

$$E_{iLext} = \sum_{k=0}^{Leq} |\hat{h}(k)|^2$$

where Lext is a predetermined memory length of an extended one of the one or more channel estimates, Lext>Leq, and Q is a constant.

In another aspect of the invention, the estimated received useful energy is an average value that is generated by determining a value, C, for each of a plurality of bursts in the received signal, and averaging the plurality of generated values C.

In still another aspect of the invention, the estimated reflection energy, R, may be determined in accordance with the following equation:

$$R = \lambda(M_{Leq} - M_{Lext})$$

where Lext is a predetermined memory length of an extended one of the one or more channel estimates, Lext>Leq, and λ is a constant.

In an alternative embodiment, the estimated reflection energy, R, may be determined in accordance with $$R = \lambda \left( E_{oLext} - \frac{(Lext - Leq)Q}{Lext + 1} M_{Lext} \right)$$

$$E_{oLext} = \sum_{k=Leq+1}^{Lext} |\hat{h}(k)|^2$$

where Lext is a predetermined memory length of an extended one of the one or more channel estimates, Lext>Leq, λ is a constant and Q is a constant.

In yet another aspect of the invention, the estimated reflection energy may be an average value that is generated by determining a value, R, for each of a plurality of bursts in the received signal, and averaging the plurality of generated values R.

BRIEF DESCRIPTION OF THE DRAWINGS

The objects and advantages of the invention will be understood by reading the following detailed description in conjunction with the drawings in which.

DETAILED DESCRIPTION

Figure 1:
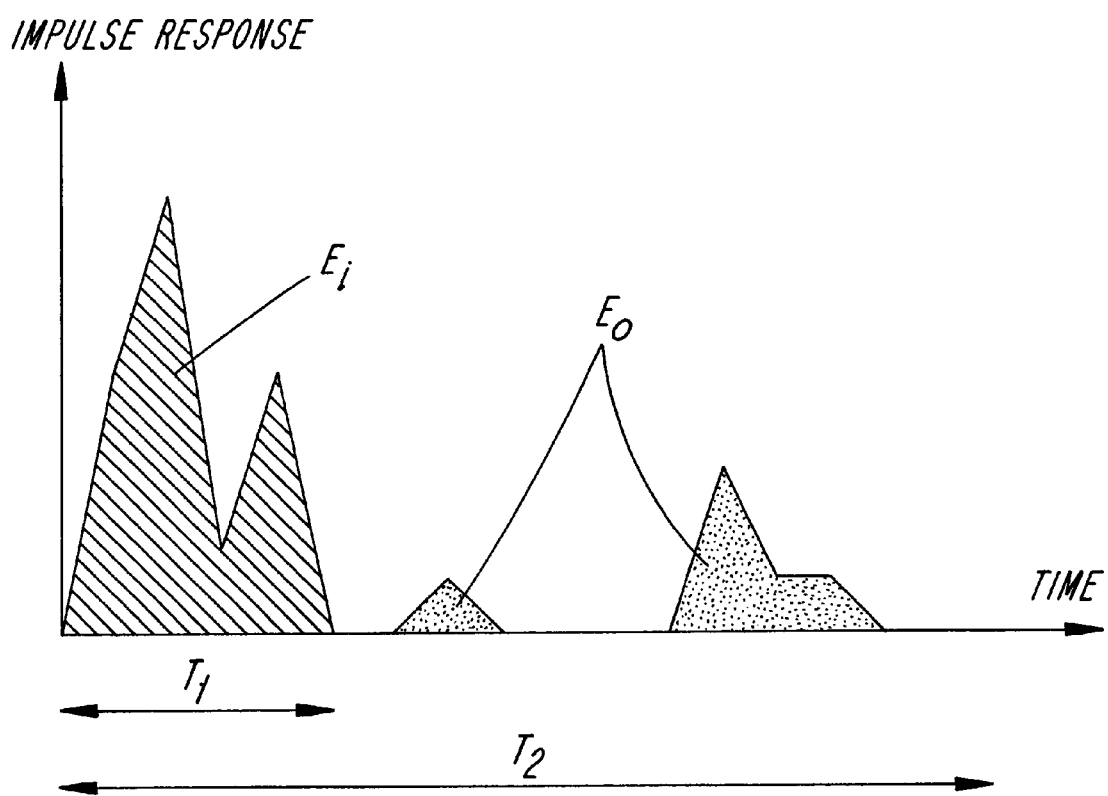
FIG. 1 is an exemplary graph of impulse response plotted as a function of time, showing the existence of signal energy both inside and outside an equalizer window.

The various features of the invention will now be described with respect to the figures, in which like parts are identified with the same reference characters.

Merely for the purpose of illustrating the inventive concepts, the invention will be described below with reference to the European GSM system for mobile telephony, which is a Time Division Multiple Access (TDMA) radio communication system. Under no circumstances, however, should this be taken as an implication that application of the inventive techniques is limited to GSM systems.

In TDMA radio communication systems, information is transmitted on a channel in the form of bursts that are transmitted by the transmitter during evenly distributed time intervals (so-called "time slots" within TDMA frames). A user is allocated to one or more specific time slots. The remaining time slots may be allocated to other users. In order to synchronize the receiver to these bursts each burst comprises a known synchronization word, also called a "training sequence", in predetermined positions within the burst. In, for example, the GSM system this training sequence is 26 bits long (for normal bursts). When the receiver expects a new burst from the transmitter, a training sequence that is identical to the 16 central bits of the training sequence is generated by a training sequence generator in the receiver. The 16 central bits in the training sequence are designed to have good correlation properties when correlated with the entire training sequence. That is, a maximum correlation equals 16 in the central position and a correlation of 0 is obtained in the remaining ten positions (i.e., the autocorrelation function, afc (k)=[0 0 0 0 0 16 0 0 0 0 0]).

This training sequence is used for forming, for example, 11 correlation values with the received samples that correspond to th(e known training sequence. When the best possible correlation is obtained between the mid 16 bits in the locally generated training sequence and the received signal, synchronization is considered to exist between the locally generated training sequence and the received signal. The best correlation may be found, for example, by comparing mutually displaced windows, each containing 5 squared correlation values, with respect to energy contents of the received signal. Once the receiver is synchronized with the received signal, the remaining bits in the received burst may he demodulated and decoded.

In addition to the synchronization itself, the training sequence is also used for channel estimation. Since the radio channel often is subjected to multipath propagation, the receiver comprises some sort of equalizer to eliminate this phenomenon. The equalizer requires a time limited estimate of the impulse response of the channel. This impulse response can be obtained from the correlation signal. For this purpose not only is a synchronization position required, but it is also necessary to have an interval or a window defining the multipath propagation and indicating where the equalizer is to operate.

Techniques for performing synchronization and channel estimation in a TDMA radio communication system are known, and need not be described here in detail. One preferred technique for performing synchronization is described in U.S. Pat. No. 5,373,507, which issued to Sköld on Dec. 13, 1994, and which is incorporated herein by reference. Channel estimation techniques are described in Simon Haykin, *Adaptive Filter Theory*, Prentice-Hall, ISBN 0-13-004052-5 025, 1986, which is incorporated herein by reference.

Figure 2:
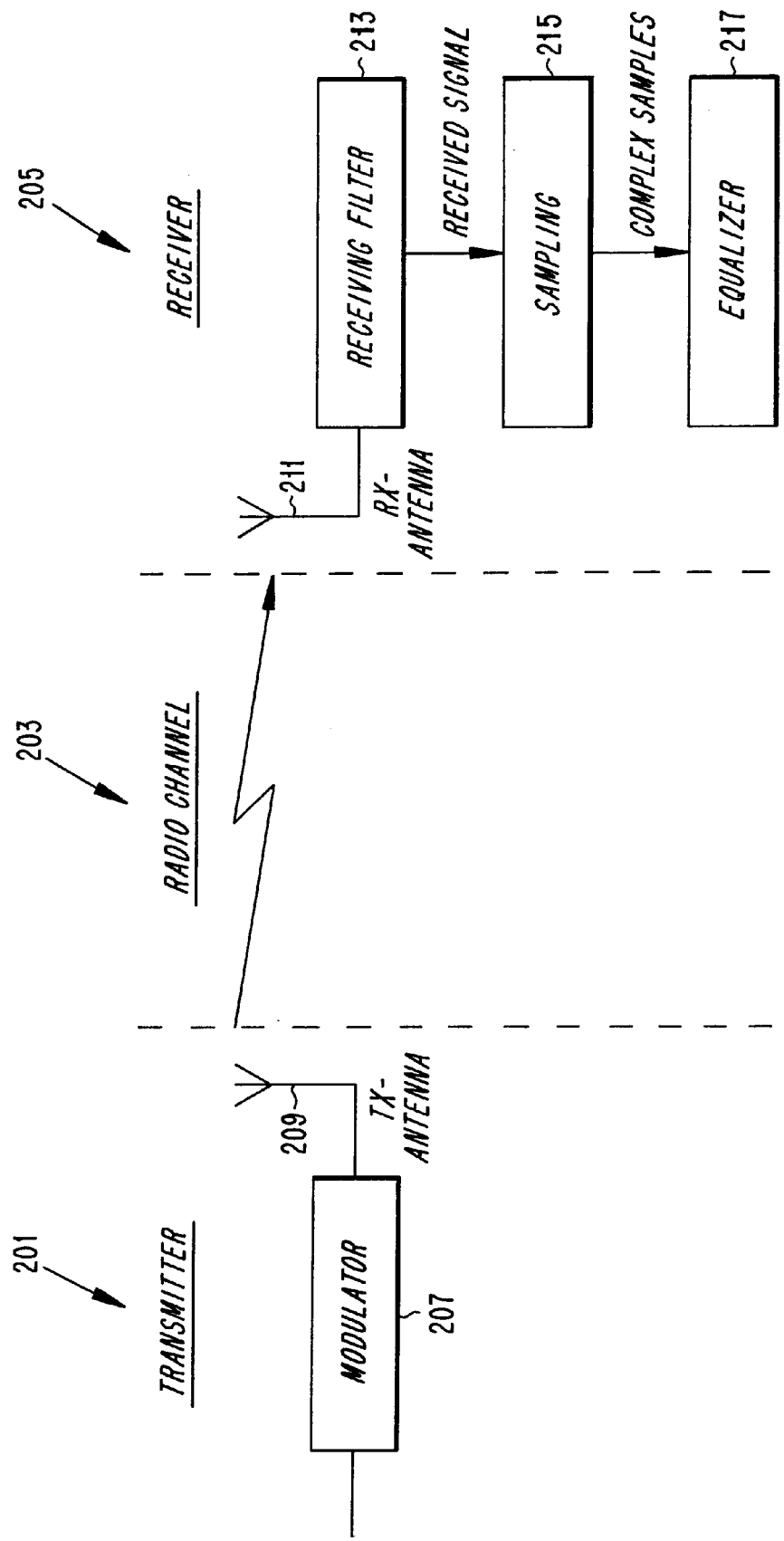
FIG. 2 is an exemplary block diagram of a system incorporating the inventive techniques described herein.

An exemplary block diagram of a system incorporating the inventive techniques described herein is shown in FIG. 2. The system is functionally divided into three components: a transmitter 201, a radio channel 203 and a receiver 205. A modulator 207 in the transmitter 201 modulates data (i.e., a burst) and transmits the modulated data, via a transmitter antenna 209, over the radio channel 203 to a receiver antenna 211 in the receiver 205. The received signal is supplied to a receiving filter 213, which removes the carrier frequency from the received signal.

The resultant signal is then supplied to a sampling block 215 which samples the signal and generates therefrom complex samples. The complex samples are then supplied to an equalizer 217, whose primary purpose is to synchronize the received bursts, estimate the radio channel impulse response (using, e.g., a Least Squares estimate), and then use that information to demodulate the received bursts (by means of, e.g., the well-known Viterbi algorithm). Essentially, the equalizer 217 creates a mathematical model ("channel estimate") of the radio channel 203 (i.e., the air interface), which is used (by the equalizer) to calculate the most probable transmitted data.

Figure 3:
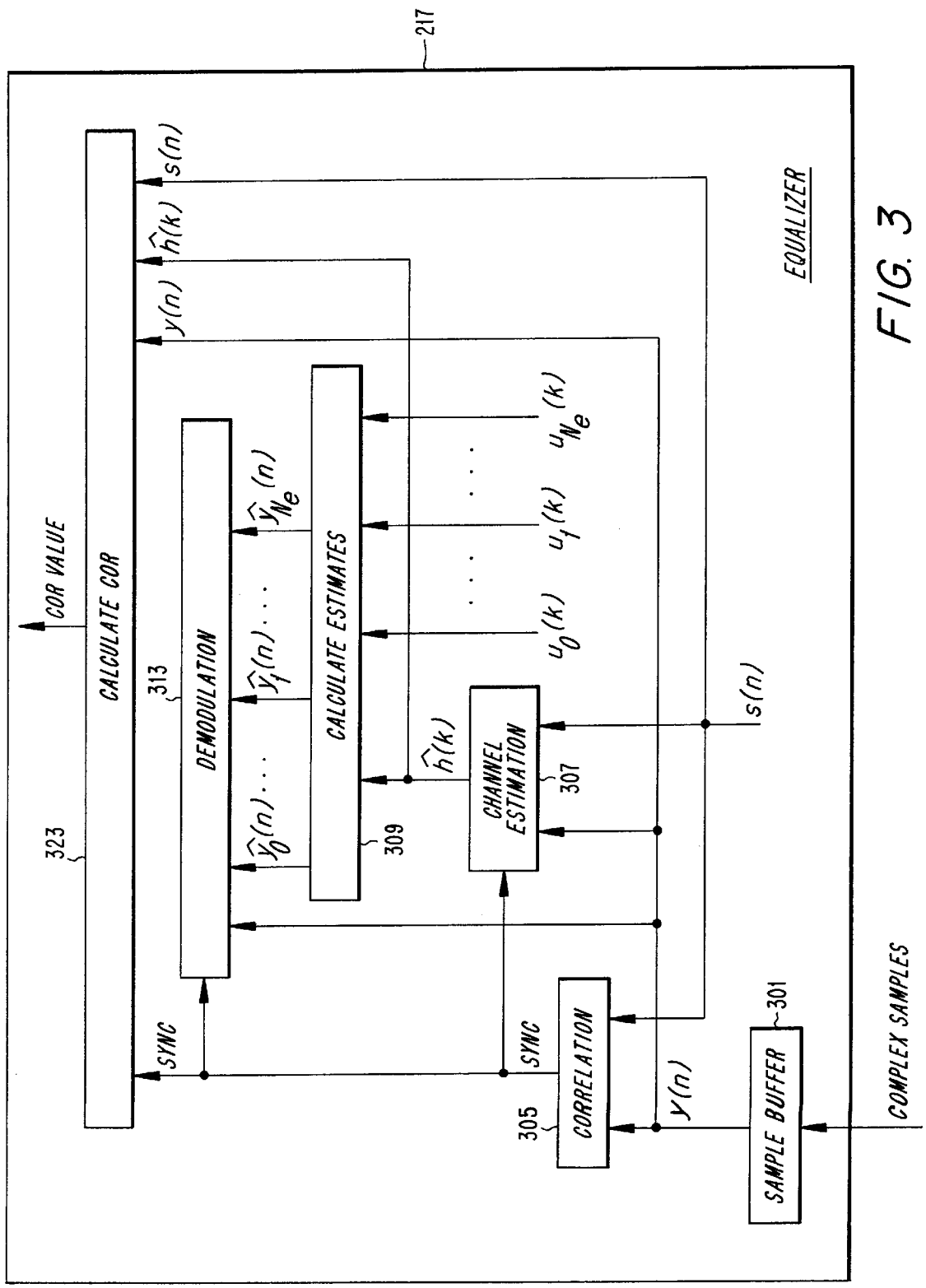
FIG. 3 is a schematic block diagram of an exemplary equalizer that may be used to implement the techniques of the present invention.

FIG. 3 is a schematic block diagram of an exemplary equalizer 217 that may be used to implement the techniques of the present invention. The complex samples, which are supplied by the sampling block 215, are received by a sample buffer unit 301, which stores them for further processing, as follows.

The complex plane data samples (designated "y(n)") are supplied by the sample buffer 301 to a number of components, as follows.

A correlation unit 305 analyzes the complex plane data samples and the known training sequence s(n), and asserts a SYNC signal when it detects the start of the burst supplied by the sample buffer. In this way, the correlation unit 305 synchronizes the burst.

A channel estimation unit 307 receives the complex plane data samples as well as the SYNC signal generated by the correlation unit 305 and the known training sequence s(n), and makes a Least Squares estimate of the channel. The channel estimate is in the form of a Finite Impulse Response (FIR) filter having a number of taps, L+1, where L is the memory length of the channel. Least Squares estimation is known in the art, and need not be described here in great detail. The following discussion will be helpful, however.

Figure 4:
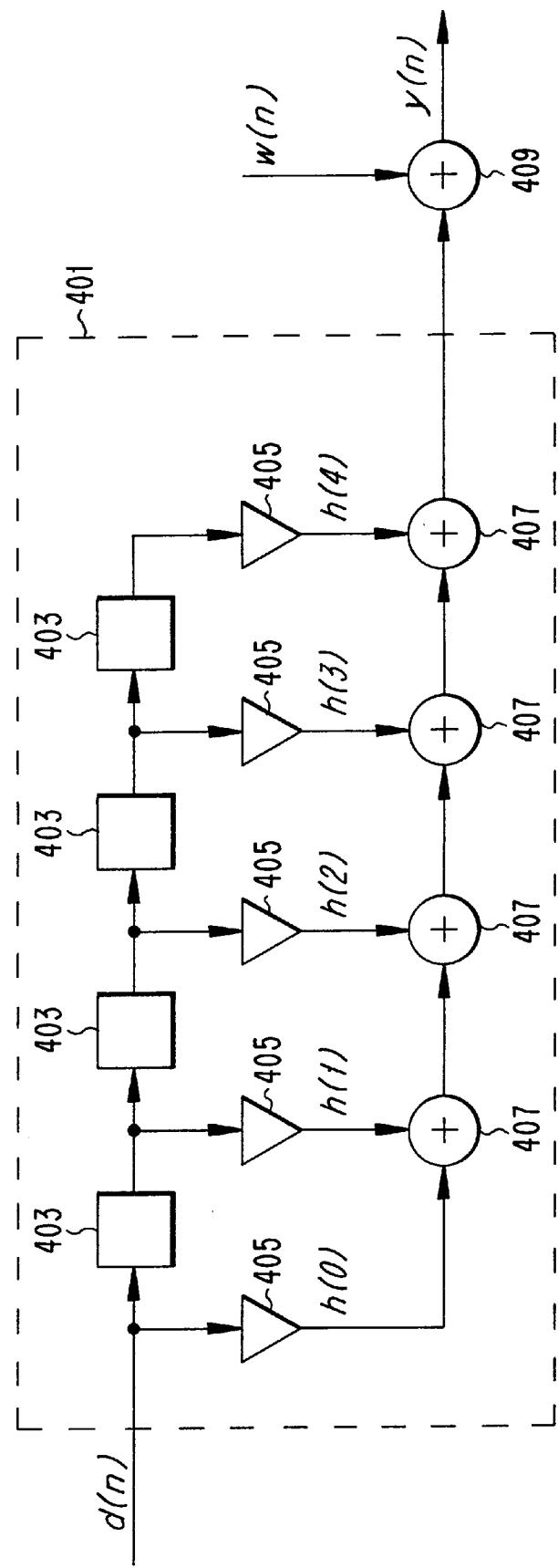
FIG. 4 is a propagation model consisting of an exemplary Finite Impulse Response (FIR) filter for modelling the channel and an adder that adds white noise to the transmitted signal.

The radio channel 203 is modeled as illustrated in FIG. 4. The model includes a channel model, modeled as a Finite Impulse Response (FIR) filter 401, the output of which is added to a white noise signal. The purpose of the white noise is to ensure that the model of the radio channel models all of the interference in the radio channel, such as cochannel interference, adjacent channel interference, thermal noise, interference from user signal energy received outside the equalizer window and any other interference received.

The exemplary FIR filter 401 is shown having five taps, each separated from the next by a delay unit 403. Each of the delay units 403 causes a transmitted data sample, d(n), to be delayed by a predetermined unit of time associated with one sample period.

Each tap is also coupled to an input of a corresponding multiplier 405. Each multiplier 405 is associated with a complex valued filter coefficient, h(0) to h(4), respectively. The value applied to the input of each multiplier 405 is multiplied by that multiplier's corresponding coefficient. The results are summed in the summing units 407, with the resultant sum being supplied to a final summing unit 409 which adds thereto white noise, w(n). The output of the final summing unit: 409 is supplied as the complex valued output, y(n).

Assume that the length of the training sequence is denoted N and that the memory length of th(s channel model is denoted L (meaning that L+1 taps are used in the channel model). The Least Squares estimate, $\hat{h}$, of the channel h is then given by the equation system:

$$S\hat{h} = y$$

where S is a matrix of order (N-L)×(L+1), given by the known training sequence, $$S = \begin{bmatrix} s(L) & \cdots & s(0) \\ \vdots & \ddots & \vdots \\ s(N-1) & \cdots & s(N-L-1) \end{bmatrix}$$

and $\hat{h}$ is a vector of order (L+1)×(1), containing the L+1 filtertap coefficients, $$\hat{h} = \begin{bmatrix} \hat{h}(0) \\ \vdots \\ \hat{h}(L) \end{bmatrix}$$

and y represents the N-L unique received samples (corresponding to the known training sequence), arranged into a vector of order (N-L)×(1), $$y = \begin{bmatrix} y(L) \\ \vdots \\ y(N-1) \end{bmatrix}$$

The equation system is solved with ordinary matrix operations, (where the superscript "H" denotes the Hermitian transpose, that is, transposition combined with complex conjugation)

$$S\hat{h} = y$$

$$S^H S\hat{h} = S^H y$$

$$\hat{h} = (S^H S)^{-1} S^H y$$

Referring back now to FIG. 3, the complex components of the estimated (L+1)-tap channel impulse response, $\hat{h}(k)$ (where k=0, ..., L) are supplied to a calculate estimates unit 309, which is used in the equalizer 217 to compute a plurality of possible received values. This computation is performed by generating each of the $2^{L+1}$ possible sequences of L+1 bits (denoted here as $u_1$ (k), where l=0, ..., $N_e$ ($N_e=2^{L+1}-1$) ; and k is the sample or bit number, k=0, ..., L). The convolution sum between each of the possible (L+1)-bit sequences and the channel estimate is then generated to provide $2^{L}+1$ sample estimates, denoted here as $\hat{y}_1(n)$ (where l=0, ..., $N_e$ ($N_e 32\ 2^{L+1}-1$):

$$\hat{y}_1(n) = \sum_{k=0}^{L} \hat{h}(k) u_1(L-k)$$

Each of the complex estimates, $\hat{y}_1(n)$, are supplied to a demodulation unit 313, which performs the demodulation of a burst. The demodulation unit 313 uses the well-known Viterbi algorithm (based on the known maximum likelihood criterion) to search a decoding "trellis" for the path having the lowest metric. The estimate corresponding to the path with the lowest metric is the maximum likelihood received symbol. Each metric is calculated from the sample estimates, $\hat{y}_1(n)$, and the actual received samples, y(n), with the metric itself representing how close the sample estimate is to the actual received sample. This aspect of the demodulation unit 313, as well as the other equalizer units described thus far, may be realized, for example, using a suitably programmed digital signal processor in a manner well-known in the art. Alternative embodiments are also possible, such as an Application Specific Integrated Circuit (ASIC) designed to operate as described above.

In accordance with one aspect of the invention, a calculate COR unit 323 is provided in addition to the above-described components. The COR unit 323 determines a COR value in accordance with any of several techniques fully described below.

Examining the problem of measuring time dispersion, if the channel model is assumed to have a memory of length L (meaning that L+1 taps are used in the channel estimate), it can be described with a set of channel taps $\{h(k)\}_0^L$. These taps are estimated with $\{\hat{h}(k)\}_0^L$, which, as described above, is preferably a least squares estimate of the channel. Alternatively, a channel estimate may be obtained by, for example, correlation. The correlation result that was calculated when the burst was synchronized is a type of channel estimate. Least squares estimation is preferred because it gives a more accurate estimate of the radio channel. In this description, the transmitted N symbol training sequence will be designated as $\{s(n)\}_0^{N-1}$, and the corresponding N-L unique received samples will be designated as $\{y(n)\}_L^{n-1}$.

A residual energy metric, $M_L$, can be formed by generating an estimate $\{\hat{y}(n)\}_L^{N-1}$ of the received signal from the channel estimate and measuring the mean square difference between the estimate of the received signal and the received signal. In other words, a residual energy metric can be formed by first using the channel estimate and a known training sequence to generate an estimate of the received signal, called the estimated received signal, and then taking the mean squared difference between the estimated received signal and the actual received signal corresponding to the known training sequence. This residual energy metric is an accurate estimate of the interference level $\sigma_W^2$. In particular, the residual energy metric may be derived as follows:

The estimate of the received unique samples (corresponding to the known training sequence), $\hat{y}$ is given by $$\hat{y} = S\hat{h}$$

The estimation error is given by $$\epsilon_y = y - \hat{y} = S h + w - S\hat{h} = S(h-\hat{h}) + w$$

where w represents the modeled interference.

Observing that $$h - \hat{h} = -(S^H S)^{-1} S^H w$$

gives $$\epsilon_y = -S(S^H S)^{-1} S^H W + W = (I - S(S^H S)^{-1} S^H) w$$

where I is the identity matrix of order (N-L)×(N-L). The Hermitian transpose of the estimation error is $$\epsilon_y^H = [(I - S(S^H S)^{-1} S^H) W]^H$$

Applying the identity $$(AC)^H = C^H A^H$$

yields $$\epsilon_y^H = W^H (I - S(S^H S)^{-1} S^H) H$$

Now applying $$(A+C)^H = A^H + C^H$$

gives $$\epsilon_y^H = W^H (I - (S(S^H S)^{-1} S^H) H)$$

Again applying $$(A\,C)^H = C^H A^H$$

yields $$\epsilon_y^H = W^H (I - S(S(S^H S)^{-1}) H) = W^H (I - S(S^H S)^{-1} S^H)$$

The squared error is calculated as $$\epsilon_y^H \epsilon_y = W^H (I - S(S^H S)^{-1} S^H)(I - S(S^H S)^{-1} S^H) W =$$
$$W^H (I - 2S(S^H S)^{-1} S^H + S(S^H S)^{-1} S^H S(S^H S)^{-1} S^H) W =$$
$$W^H (I - S(S^H S)^{-1} S^H) W$$

Utilizing the fact that $$Tr(x) = x$$

if x is scalar (where the notation "Tr()" represents the trace of a matrix, i.e., the sum of the entries along the matrix's principal diagonal), we have $$\epsilon_y^H \epsilon_y = Tr(W^H (I - S(S^H S)^{-1} S^H) W)$$

Now, observing that $$Tr(AC) = Tr(CA)$$

we have $$\epsilon_y^H \epsilon_y = Tr((I - S(S^H S)^{-1} S^H) W W^H)$$

Applying $$Tr(A+C) = Tr(A) + Tr(C)$$

yields $$\epsilon_y^H \epsilon_y = Tr(WW^H) - Tr(S(S^H S)^{-1} S^H W W^H)$$

Taking the expectation of this yields $$E\{\epsilon_y^H \epsilon_y\} = E\{Tr(WW^H) - Tr(S(S^H S)^{-1} S^H W W^H)\} = Tr(E\{WW^H\}) - Tr(S(S^H S)^{-1} S^H E\{WW^H\})$$

Assume that $$E\{WW^H\} = \sigma_W^2 I$$

where $\sigma_W^2$ is the interference level and I is the identity matrix of order (N-L)×(N-L). The Mean Squared Error (MSE) is calculated as $$E\{\epsilon_y^H \epsilon_y\} = Tr(\sigma_W^2 I) - Tr(S(S^H S)^{-1} S^H \sigma_W^2 I) = (N-L)\sigma_W^2 - \sigma_W^2 Tr(S(S^H S)^{-1} S^H)$$

Applying $$Tr(AC) = Tr(CA)$$

gives $$E\{\epsilon_y^H \epsilon_y\} = (N-L)\sigma_W^2 - \sigma_W^2 Tr((S^H S)^{-1} S^H S) = (N-L)\sigma_W^2 - \sigma_W^2 Tr(I)$$

Now, recognizing that the order of I is (L+1)×(L+1), we obtain $$E\{\epsilon_y^H \epsilon_y\} = (N-L)\sigma_W^2 - \sigma_W^2 (L+1) = (N-2L-1)\sigma_W^2$$

where N is the length of the training sequence and L is the channel memory length.

A residual energy metric $M_L$, which is an estimate of $\sigma_W^2$, herein designated $\hat{\sigma}_W^2$, may be derived by assuming that $$E\{\epsilon_y^H \epsilon_y\} = m$$

where m represents the expectation value.

Consequently, an estimate of m, herein denoted $\hat{m}$, can be calculated as the actual value of $\epsilon_y^H \epsilon_y$, because there is only one set of y values per burst. Therefore, an estimate of m is:

$$\hat{m} = \varepsilon_y^H \varepsilon_y = \sum_{n=L}^{N-1} |\hat{y}(n) - y(n)|^2$$

Now, the estimate of a $\sigma_W^2$ can be determined with:

$$M_L = \hat{\sigma}_w^2 = \frac{1}{N - 2L - 1} \sum_{n=L}^{N-1} |\hat{y}(n) - y(n)|^2 \qquad (2)$$

where $$\hat{y}(n) = \sum_{k=0}^{L} s(n-k)\hat{h}(k), \quad n = L, \ldots, N-1 \qquad (3)$$

In accordance with one aspect of the invention, the carrier over reflection can be calculated using the energy in the impulse response together with residual energy metrics in accordance with Equation (2) obtained from channel estimates of different lengths.

The carrier energy is the useful energy on the radio channel, that is, the energy inside the selected equalizer window. It will depend on the channel estimate, because a longer estimate (i.e, with more channel taps) makes it possible to use more energy during the signal detection process. For example, an estimate of the energy contained in a channel estimate of length L is denoted $E_L$. Where L=Leq (meaning that Leq+1 taps are used in the channel estimate), the energy estimate is denoted $E_{Leq}$, which is the sum of the energy of the Leq+1 taps in the channel estimate. For example, if L=Leq=4 (i.e., corresponding to a 5 tap channel estimate) the energy estimate is denoted $E_4$. The $E_{Leq}$ measure, however, measures both the energy in the real channel taps as well as the energy in the estimation error of the channel taps. This estimation error should, therefore, be subtracted.

In order to subtract the estimation error, the total interference level on the radio channel needs to be estimated. This can be done from the residual energy metric $M_{Leq}$ (corresponding to a Leq+1 tap channel estimate), which is a measure of all non-used (residual) energy taken in by the receiver (i.e., thermal noise, cochannel interference, adjacent channel interference, interference from user signal energy received outside the equalizer window, plus any other interference received). In this example, L=Leq=4 and, hence, the residual energy metric is denoted $M_4$. From the interference level estimate $M_{Leg}$, the channel estimation error can be deduced. In this example, when L=Leq=4, the channel estimation error is approximately $0.23M_4$ (the determination of the constant "0.23" is explained in greater detail below).

The reflection energy is the energy received outside the equalizer window. This is a part of the energy that is measured by the metric $M_{Leq}$ (in this example, $M_4$), which measures all non-used energy taken in by the receiver (including thermal noise, cochannel interference, adjacent channel interference, interference from user signal energy received outside the equalizer window, plus any other interference received). If in addition to the "normal" Leq+1 tap channel estimate (in this example, a 5-tap channel estimate), another channel estimate is formed with as many taps as possible (e.g., an 11-tap channel estimate), a measure, $M_{Lext}$ (e.g., $M_{10}$ for the "extended" 11-tap channel estimate), can be formed that represents all non-used energy taken in by the receiver assuming a very long channel estimate. That long estimate will contain almost all of the received user signal, because it assumes a very large channel estimate.

If it is assumed that the long or extended (e.g., 11-tap) estimate in fact contains all user signal energy, the measure $M_{Lext}$ (in this example, $M_{10}$) will in fact only measure thermal noise, cochannel interference and other interference (i.e., the non-useful energy). If $M_{Lext}$ is subtracted from $M_{Leq}$, the difference $M_{Leq}-M_{Lext}$ will be a measure of user signal energy received outside the "normal" (e.g., 5-tap) equalizer window (i.e., the reflection energy). If there is further received user signal energy outside the extended (e.g., 11-tap) estimate, the metric $M_{Lext}$ will also contain this energy. The $M_{Leq}-M_{Lext}$ reflection energy measure will then not contain this energy. The long (extended) channel estimate should therefore be as long as possible, limited only by the length of the training sequence.

The COR value can now be calculated as the ratio of the useful carrier energy measure and the reflection energy measure.

The metrics $M_{Leq}$ (for a "normal" number of taps in the channel estimate) and $M_{Lext}$ (for an "extended" number of taps in the channel estimate) indicate the quality of the two estimates, because they estimate the "residual interference energy" of the signal. As mentioned earlier, the GSM system specifies that, for normal bursts, only 26 bits are available in the training sequence. This means that, for a GSM system, it is impossible to calculate a least squares estimate extending beyond 13 taps.

Also as shown above, the difference $M_{Leq}-M_{Lext}$ is a very good measure of the energy outside the "normal"-length (e.g., 5-tap) equalizer window because it represents the extra error introduced when a too short "normal"-length estimate is used.

Figure 5:
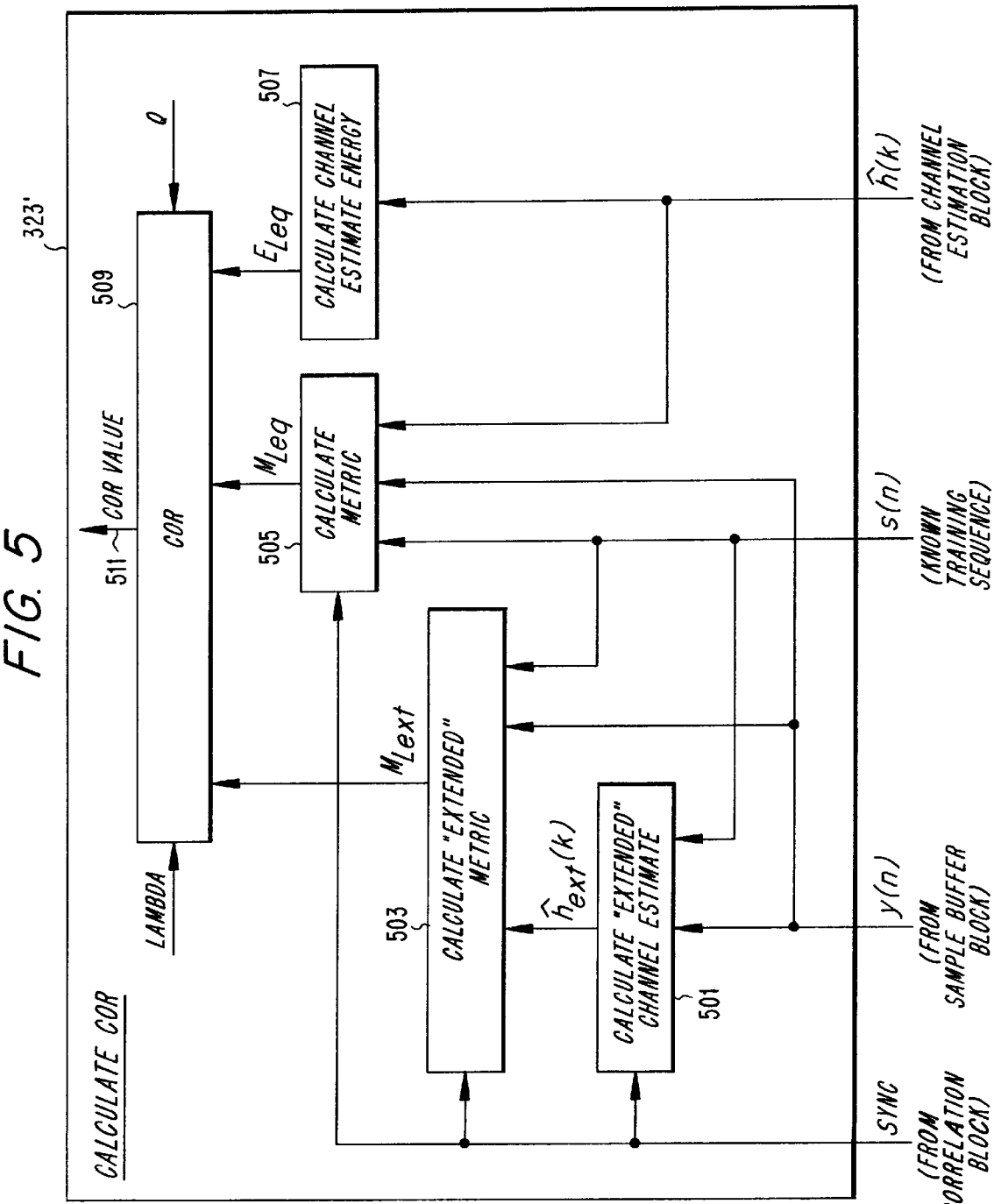
FIG. 5 is a block diagram of a COR unit in accordance with one embodiment of the invention.

Thus, in accordance with one aspect of the invention, an embodiment of which is illustrated in FIG. 5, an estimate of the COR can be obtained by determining a quantity as the energy of the channel estimate minus an interference estimate, and dividing that quantity by the estimated reflection energy outside the equalizer window. More particularly, an estimate of the COR may be determined in accordance with the following:

$$COR = 10 \cdot \log\left(\frac{E_{Leq} - QM_{Leq}}{\lambda(M_{Leq} - M_{Lext})}\right) \qquad (4)$$

where $$E_{Leq} = \sum_{k=0}^{Leq} |\hat{h}(k)|^2 \qquad (5)$$

where $E_{Leq}$ is the channel impulse response energy (from a least squares estimate with Leq equal to a "normal" channel memory length, such as 4) and $\lambda$ is a scaling factor. It will be observed that in the figures (e.g., FIGS. 5 and 8), a channel estimate based on an assumed memory length of Leq is merely denoted by $\hat{h}(k)$, whereas a channel estimate based on an assumed extended length of Lext is denoted by $\hat{h}_{ext}(k)$. The COR value determined in accordance with Equation (4) is expressed in decibels. However, this is not a requirement. Rather, what is important is that the numerator of Equation (4) represents an estimate of received usef-l energy (which may be denoted as "C"), and that the denominator of Equation (4) represents an estimate of reflection energy (which may be denoted as "R"), and that a comparison of these estimates is a measure of time dispersion in the received signal. In a preferred embodiment, all estimates of received useful energy are averaged over a number of bursts, as are all estimates of reflection energy.

In Equation (4), a value for Q is derived from the following $$Q = Tr(B^H B)$$

where $$B = (S^H S)^{-1} S^H$$

and $$B^H = S(S^H S)^{-1}$$

where S is a matrix of order (N-L)×(L+1), given by the known training sequence, $$S = \begin{bmatrix} s(L) & \cdots & s(0) \\ \vdots & \ddots & \vdots \\ s(N-1) & \cdots & s(N-L-1) \end{bmatrix}$$

and N represents the length of the training sequence and L represents the memory length of the channel. It can be seen that a value for Q is training sequence dependent, and equals approximately 0.23 (L=4) for all training sequences used in normal bursts in GSM.

It can be shown, by simulation, that the metric $M_L$ is affected differently by interference and extra time dispersion respectively. The extra channel taps between those found in the "normal" equalizer channel model and those found in an "extended" equalizer channel model will also give different effect to $M_L$ and it also varies between the eight different training sequences defined for normal bursts in a GSM system. The scaling factor, $\lambda$, is therefore applied as shown in Equation (4). To determine a suitable value for $\lambda$, it is helpful to understand that the measures $M_{Leq}$ and $M_{Lext}$ of received residual energy are performed by using squared metrics of the data during the training sequence. The training sequences are of limited length and have non-ideal properties and can therefore give errors in the estimates. There is a systematic error which will vary depending on the training sequence used. The error in the reflection energy measure will also vary depending on the tap position of the reflected energy.

By introducing a factor $\lambda$ in Equation (4), the systematic error can be compensated for. A different value of $\lambda$ will then have to be used for each training sequence. It is also possible to select an average value for $\lambda$ that will minimize the systematic error over all training sequences.

A value for $\lambda$ is most easily estimated by simulations of the COR measure with different training sequences and with reflected energy in different tap positions.

Figure 6:
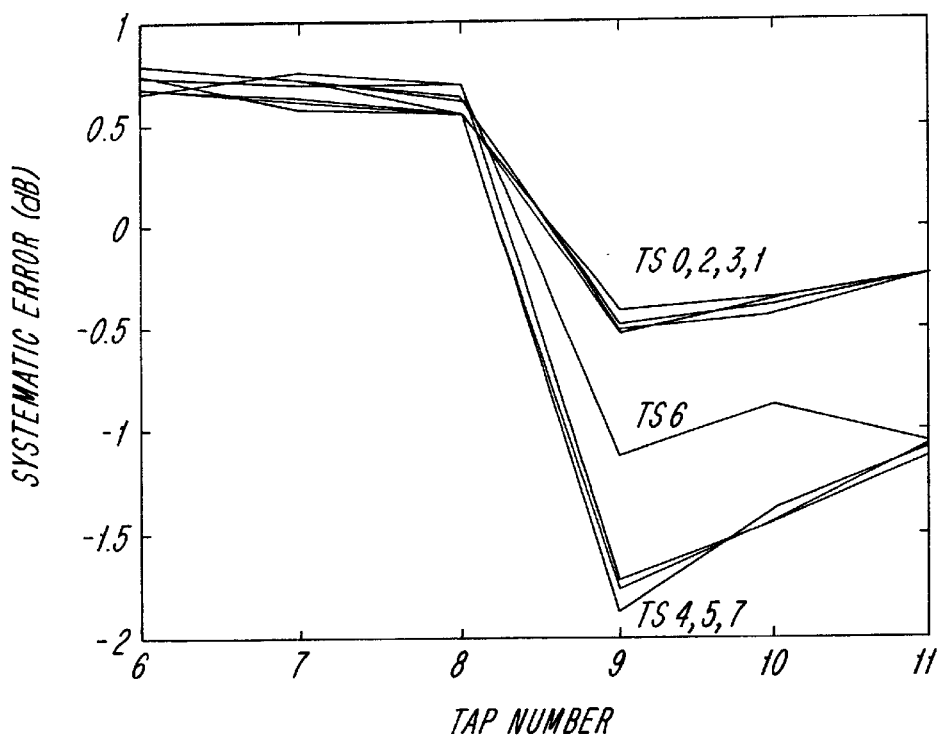
FIG. 6 is a graph depicting the resulting systematic error associated with different training sequences and tap positions respectively.

For the case of training sequences used in normal bursts in GSM, the error is minimized for $\lambda = 0.948$. The resulting systematic error for this GSM example is shown in FIG. 6 for different training sequences and tap positions respectively. The graph is a plot of how much the energy in a certain tap position will be over- or underestimated by the algorithm.

It can be seen from FIG. 6 that for half of the available training sequences (i.e., training sequences numbered 0, 1, 2 and 3), the bias error is within ±0.5 dB. The error is down to −1 dB for training sequence number 6, and at most almost −2 dB for training sequences numbered 4, and 7. This large error occurs for energy in tap positions 9, 10 and 11, which will be underestimated by 1 to 2 dB. In general the measurement is more sensitive in tap positions 6, 7 and 8.

Referring back to FIG. 5, the above-described technique may be implemented in one embodiment of the COR unit 323' by means of a number of components as follows. An "extended" channel estimate calculation unit 501 determines an extended channel estimate of length Lext (where Lext>Leq, Leq being related to the number of taps in the channel estimate calculated by the equalizer's channel estimation unit 307). Operation of the extended channel estimate calculation unit 501 is analogous to that of the channel estimation unit 307. The difference is the number of taps in the presumed channel model.

An "extended" metric calculation unit 503 uses the extended channel estimate along with knowledge of the training sequence and the corresponding unique received samples to calculate the corresponding residual energy metric for use in Equation (2), above.

Another metric calculation unit 505 calculates a residual energy metric from the equalizer channel estimate along with knowledge of the training sequence and the corresponding unique received samples. The metric calculated here, which is also for use in Equation (2), is for the "non-extended" channel model (i.e., Leq+1 taps instead of Lext+1).

A channel estimate energy calculation unit 507 is further provided in the calculate COR unit 323' for the purpose of calculating energy in the equalizer channel estimate in accordance with Equation (5).

The respective outputs from the extended metric calculation unit 503, the other metric calculation unit 505 and the channel estimate energy calculation unit 507 are supplied to a COR unit 509, which calculates a COR value 511 in accordance with Equation (4).

Figure 9:
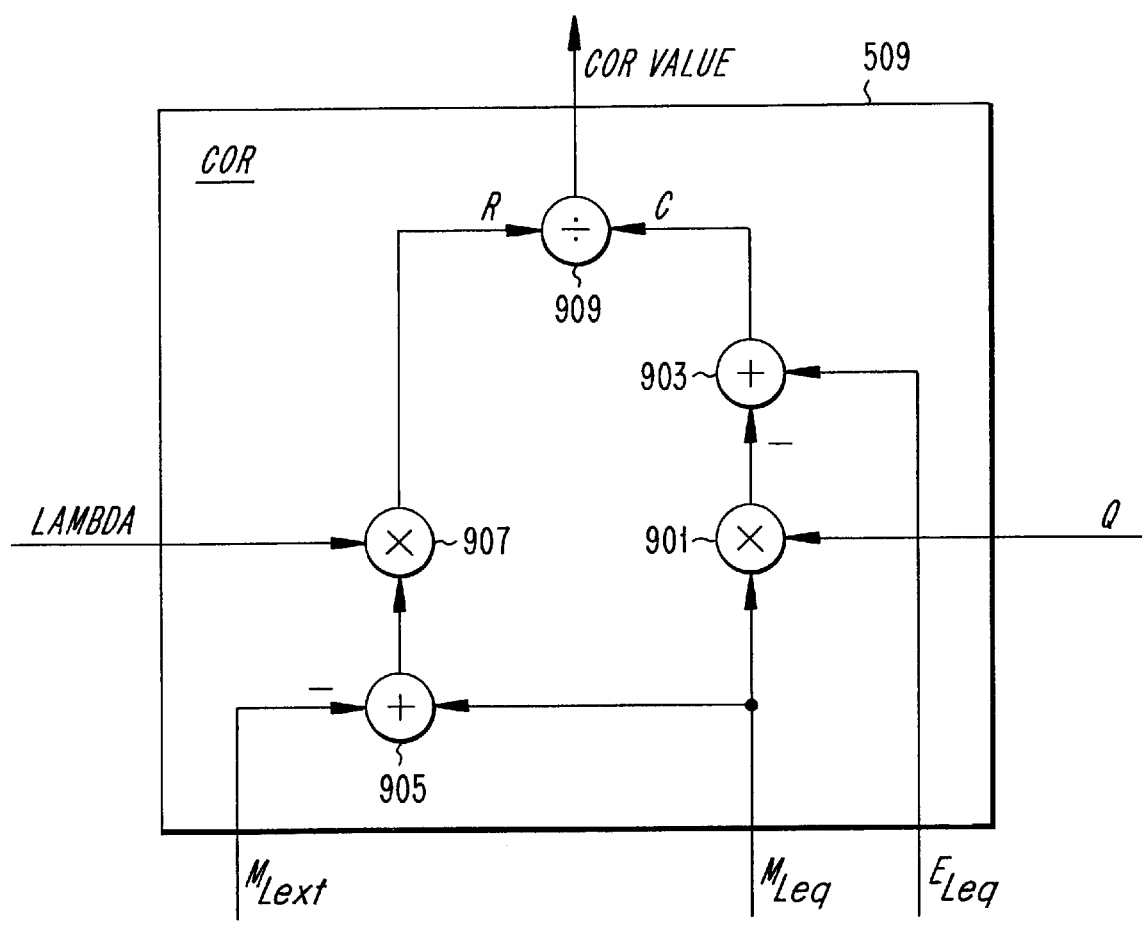
FIG. 9 is a block diagram of a COR unit in accordance with an exemplary embodiment of the invention.

An exemplary embodiment of the COR unit 509 is shown in FIG. 9. To form an estimate of received useful energy, C, the residual energy metric, $M_{Leq}$ is supplied to one input of a first multiplier 901. The constant Q is supplied to a second input of the first multiplier 901. The output of the first multiplier is then supplied to one input of a first adder 903. A second input of the first adder 903 receives the channel impulse response energy, $E_{Leq}$. The output of the first adder consequently represents C, the estimate of received useful energy.

An estimate of reflection energy, R, is generated by supplying the residual energy metric, $M_{Leq}$ to one input of a second adder 905. A second input of the second adder 905 receives a different residual energy metric, $M_{Lext}$, which is based on an extended channel estimate. The output of the second adder 905 is supplied to a first input of a second multiplier 907. A second input of the second multiplier 907 receives a signal representing the value $\lambda$. The output of the second multiplier 907 then represents the estimate of reflection energy, R.

To generate a measure of time dispersion, a COR value is formed by supplying the output of the first adder 903 to a numerator input of a divider 909, and supplying the output of the second multiplier 907 to a divisor input of the divider 909. The output of the divider 909 is a COR value.

It will be recognized by those having ordinary skill in the art that, in alternative embodiments, any and all of the above units may be replaced by a suitably programmed digital signal processor in a manner well-known in the art. In other alternative embodiments, one or more appropriately designed ASICs could be utilized.

The above-described time dispersion measurement technique was simulated in a Matlab environment, together with a simple model of the propagation and a model of the receiver in a GSM system. Ideal synchronization (known equalizer window position) was assumed. Matlab is made by The Math Works, Inc, of South Natick, Mass. 01760.

The channel model in the simulation was realized as a Rayleigh fading channel with 11 equal strength taps. The equalizer window was 5 taps long, covering the 5 first taps in the channel. Measurement of time dispersion was performed over 100 bursts and then averaged. From each set of 50 averaged measurements, a 95% confidence interval was estimated from the standard deviation. The simulation results are shown plotted in FIG. 7 for different noise levels, given as $E_b/N_o$. The graph shows accuracy of measurement (given as 95% confidence interval) plotted as a function of COR level. No systematic error other than the one described earlier was found in the measurements.

Figure 7:
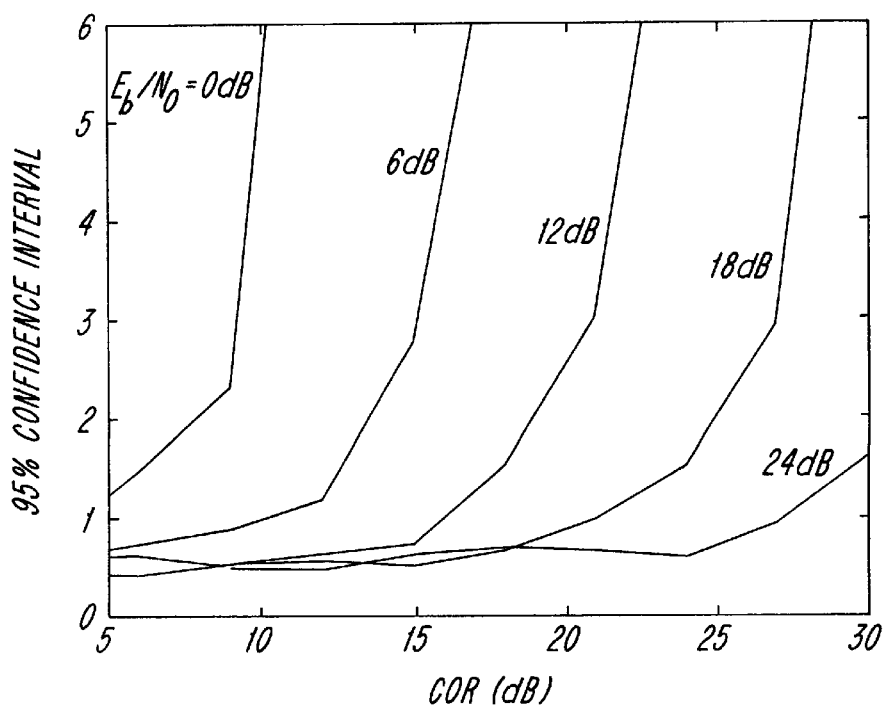
FIG. 7 is a graph depicting simulation results for different noise levels.

It can be seen from FIG. 7 that that accuracy of measurement is within 1 dB as long as the COR level is no more than 3 to 4 dB above the $E_b/N_o$. If the COR level is more than 3 to 4 dB above $E_b/N_o$, the energy (missed by the equalizer window) is well below the interference level and can therefore not be estimated with good accuracy. Better than 2 dB accuracy is achieved for COR levels up to 7 to 8 dB above $E_b/N_o$. At even higher COR levels, the measurements are very inaccurate.

The accuracy of measurements can also be improved by increasing the measurement period to be more than 100 bursts. The confidence interval is halved at 400 bursts because it is inversely proportional to the square root of the measurement interval length.

In an alternative embodiment, the COR can also be estimated directly from the taps of a Least Squares channel estimate and a residual energy metric, similar to the technique described in the BACKGROUND section of this disclosure. The difference is that the Least Squares estimate of the channel will avoid the problem associated with the prior art technique, namely, the problem of non-ideal correlation properties of the training sequence when it is used for estimates that are too long, and the problem of correlation with unknown data bits.

Figure 8:
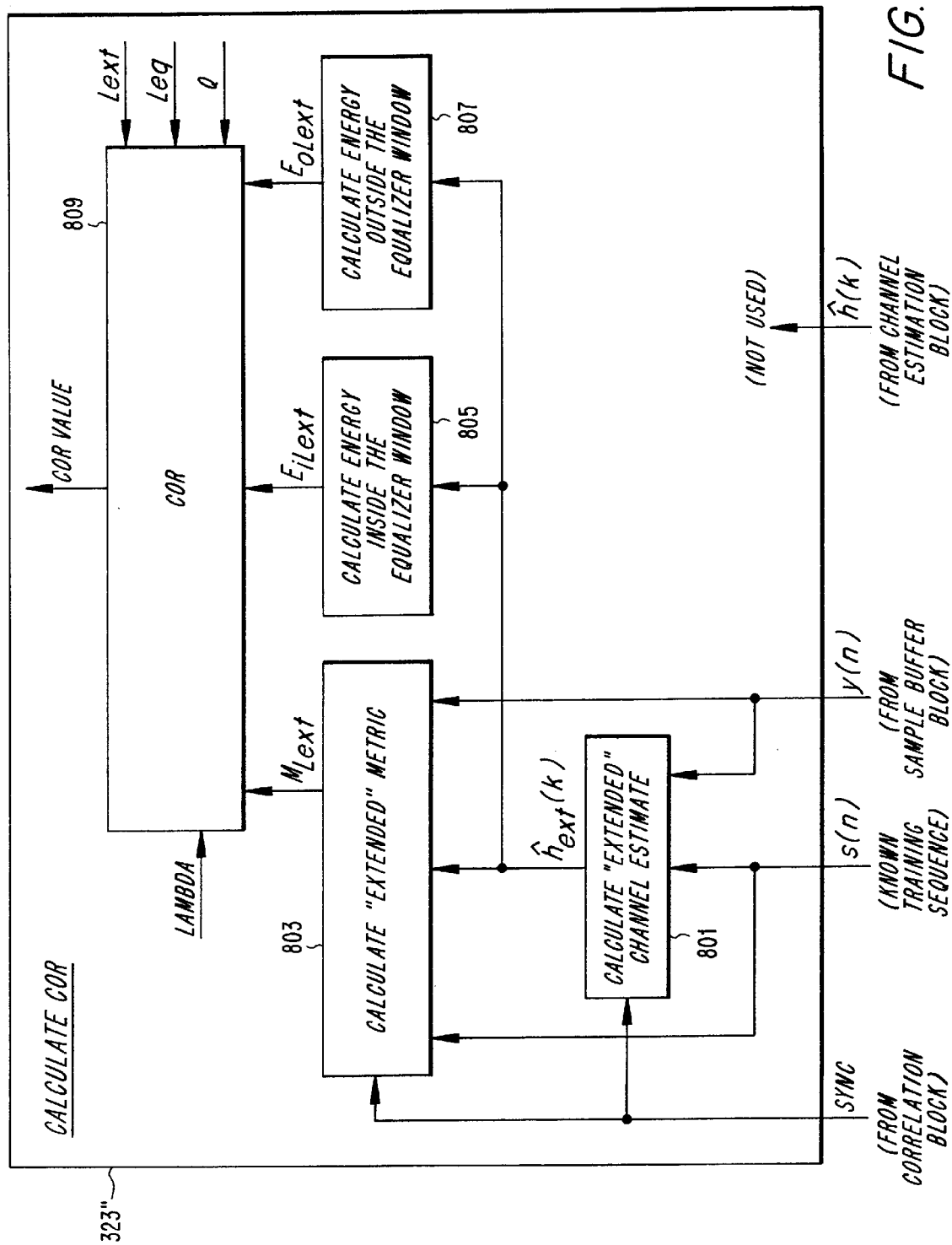
FIG. 8 is a block diagram depicting an alternative embodiment of a COR unit in accordance with the invention.

This alternative embodiment may be realized by means of the components illustrated in the block diagram of FIG. 8. Using the same example with an (Leq+1)-tap (L=Leq) equalizer window and a time dispersion measurement over Lext+1 taps (L=Lext), the COR can be estimated as:

$$COR = 10 \cdot \log \left( \frac{E_{iLext} - \frac{(Leq+1)Q}{Lext+1} M_{Lext}}{\lambda \left( E_{oLext} - \frac{(Lext-Leq)Q}{Lext+1} M_{Lext} \right)} \right) \quad (6)$$

$$E_{iLext} = \sum_{k=0}^{Leq} |\hat{h}(k)|^2 \quad (7)$$

$$E_{oLext} = \sum_{k=Leq+1}^{Lext} |\hat{h}(k)|^2 \quad (8)$$

where $E_{iLext}$ and $E_{oLext}$ are the estimated energies inside the equalizer window ($T_1$) and outside the window (remainder of $T_2$). The total error energy in the extended channel estimate is equal to $QM_{Lext}$, where Q is calculated as described above, and $M_{Lext}$ is the residual energy metric calculated as described above with respect to Equation (2). When Lext=10, Q equals approximately 1.15 for all training sequences used in normal bursts in GSM. Assuming that this error energy is distributed equally over the Lext+1 taps, the error energy inside the equalizer window can be expressed as, ((Leq+1)Q)/(Lext+1), and the error energy outside the equalizer window can be expressed as ((Lext-Leq)Q)/(Lext+1), where Leq represents the memory length of a "normal" channel estimate, and Lext represents the memory length of an extended channel estimate (Lext>Leq).

The COR value determined in accordance with Equation (6) is expressed in decibels. However, this is not a requirement. Rather, what is important is that the numerator of Equation (6) represents an estimate of received useful energy (which may be denoted as "C"), and that the denominator of Equation (6) represents an estimate of reflection energy (which may be denoted as "R"), and that a comparison of these estimates is a measure of time dispersion in the received signal. In a preferred embodiment, all estimates of received useful energy are averaged over a number of bursts, as are all estimates of reflection energy.

Referring now to the block diagram of FIG. 8, the calculate COR unit 323" includes an "extended" channel estimate calculation unit 801, which calculates an extended channel estimate of length Lext+1 (where Lext>Leq, where Leq is the memory length of the Leq+1 tap channel estimate).

The estimate generated by the "extended" channel estimate calculation unit 801 is supplied to an "extended" metric calculation unit 803, which calculates the residual energy metric from the "extended" channel estimate in accordance with Equation (2).

An energy inside the equalizer window calculation unit 805 is also provided for calculating the energy in the equalizer window from the extended channel estimate in accordance with Equation (7).

Also provided is an energy outside the equalizer window calculation unit 807, for calculating the energy outside the equalizer window based on the extended channel estimate in accordance with Equation (8).

Finally, a COR unit 809 is provided which utilizes the respective outputs of the energy inside the equalizer window calculation unit 805, the energy outside the equalizer window calculation unit 807 and the "extended" metric calculation unit 803, to calculate the COR value in accordance with Equation (6).

Figure 10:
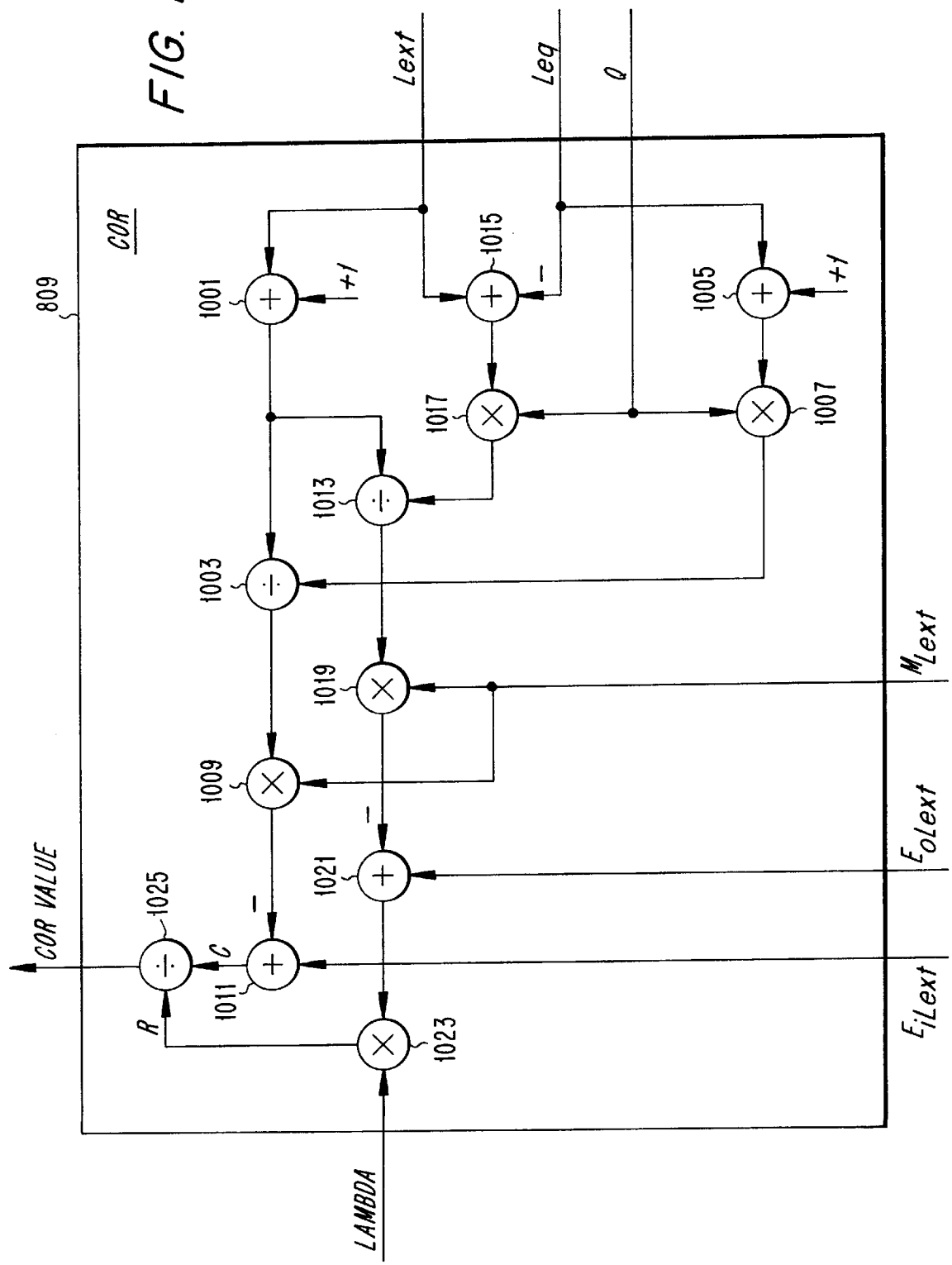
FIG. 10 is a block diagram of a COR unit in accordance with an exemplary alternative embodiment of the invention.

An exemplary embodiment of the COR unit 809 is shown in FIG. 10. To form an estimate of received useful energy, C, a first adder 1001 adds a value of Lext to a constant 1. The output of the first adder 1001 is supplied to denominator input of a first divider 1003. The numerator input of the first divider 1003 is generated as follows. Two inputs of a second adder 1005 receive, respectively, a signal representing a value of Leq and a constant 1. The output of the second adder 1005 is supplied to one input of a first multiplier 1007. A second input of the first multiplier 1007 receives a signal representing the value Q. The output of the first multiplier 1007 is then supplied to the numerator input of the first divider 1003.

The output of the first divider 1003 is supplied to a first input of a second multiplier 1009. A second input of the second multiplier 1009 receivers a value for the residual energy metric, $M_{Lext}$, which is based on an extended channel estimate. The output of the second multiplier 1009 is supplied to an inverting input of a third adder 1011. A second (non-inverting) input of the third adder 1011 receives a value for the estimated energy inside the equalizer window, $E_{iLext}$. (The third adder 1011 in this case acts as a subtractor.) The output of the third adder 1011 represents C, the estimate of received useful energy.

To generate a value for reflection energy, R, The output of the first adder 1001 is supplied to a denominator input of a second divider 1013. A numerator input of the second divider 1013 receives a signal that is generated as follows. A fourth adder 1015 adds together signals representing Lext and Leq, and supplies the resultant sum to one input of a third multiplier 1017. The output of the third multiplier 1017 is then supplied to the numerator input of the second divider 1013.

The output of the second divider 1013 is supplied to one input of a fourth multiplier 1019. A second input of the fourth multiplier 1019 receives the value for the residual energy metric, $M_{Lext}$, which is based on an extended channel estimate. The output of the fourth multiplier 1019 is supplied to an inverting input of a fifth adder 1021. A second (non-inverting) input of the fifth adder 1021 receives a value for the estimated energy outside the equalizer window, $E_{oLext}$. (The fifth adder 1021 in this case acts as a subtractor.) The output of the fifth adder 1021 is supplied to a fifth multiplier 1023. A second input of the fifth multiplier 1023 receives a signal representing the value λ. The output of the fifth multiplier 1023 then represents the estimate of reflection energy, R.

To generate a measure of time dispersion, a COR value is formed by supplying the output of the third adder 1011 to a numerator input of a third divider 1025, and supplying the output of the fifth multiplier 1023 to a divisor input of the third divider 1025. The output of the third divider 1025 is a COR value.

It will be recognized by those having ordinary skill in the art that, in alternative embodiments, any and all of the above units may be replaced by a suitably programmed digital signal processor in a manner well-known in the art. In other alternatives, any and all of the above units may be replaced by one or more ASICs.

One problem with the COR measurements generated in accordance with Equations (2) to (8) is that both the carrier and reflection energies are estimated by taking the difference of other estimates. Because these estimates contain random errors, this may cause large variations in the COR estimates and may occasionally generate negative values. The accuracy of the COR value will, however, improve if each energy estimate is averaged over a number of bursts, such as 100 to 400 bursts.

Even if a large amount of averaging is performed, however, there is still a risk that the relative error in the COR estimate will be very large, especially if the COR value is very high compared to the signal-to-noise ratio (SNR) of the signal. It is, therefore, advantageous to have a confidence measure regarding the generated COR value.

Such a confidence measure can be formed by also estimating the standard deviation $\sigma_{COR}$ of the COR from the K=100 to 400 bursts. A 95% confidence interval can then be formed as $$\pm \frac{1.96 \sigma_{COR}}{\sqrt{K}} \quad (9)$$

Such a confidence interval should be estimated for each COR value. If the interval is relatively large compared to the COR value, the COR value can be disregarded as unreliable. The implication, in this instance, is that the COR value is much larger than the signal to noise ratio (SNR), and hence excessive time dispersion is not a problem.

The various techniques described above provide an accurate way of estimating a COR value from residual energy metrics in the equalizer, without the irreducible errors associated with conventional correlation methods.

The COR measurements as generated by the above techniques have many uses in a cellular communications system. A major application is to monitor whether a cell has a problem with excessive time dispersion. One response to detection of excessive time dispersion an a call is to handover that call to another cell. If problems with time dispersion occur often in the same cell, then a re-planning of that cell site is a possible solution, either by adjusting the base station antenna (e.g., not to pick up far away reflections), moving the site, or adding a new site.

Another advantage of the inventive COR measurement techniques is that they make "true" Carrier to Interference (C/I) measurements possible. An equalizer estimate of the C/I will normally contain both cochannel and adjacent channel interference, plus received rays outside the equalizer window. The COR measurement makes it possible to estimate this latter effect separately and subtract that energy from the C/I measure, thereby obtaining a "truer" C/I measure.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, the invention has been described with reference to the European GSM-system. However, it is appreciated that the same principles can also be used in other systems as well, such as the American mobile radio communication system in accordance with the standard IS-54. In fact, the invention can be used in any system that makes a channel estimate for use by the receiver during detection (the channel estimate having equally or unequally spaced taps or fingers) and that has a training sequence or other transmitted bit sequence that is known by the receiver. Such systems can be, for example, TDMA systems, Code Division Multiple Access (CDMA) systems, or hybrids thereof.

Also, alternative techniques have been described wherein a COR value may be determined in accordance with Equation (4) or in accordance with Equation (6). However, each of these equations has, in its numerator, a term representing an estimate of received useful energy in the signal, and each of these equations has, in its denominator, an estimate of reflection energy in the received signal. Consequently, in alternative embodiments, one may determine a measure of time dispersion by using the numerator of Equation (4) to determine an estimate of received useful energy, and using the denominator of Equation (6) to determine an estimate of reflection energy, and then comparing these quantities. In other alternative embodiments, one may determine a measure of time dispersion by using the numerator of Equation (6) to determine an estimate of received useful energy, and using the denominator of Equation (4) to determine an estimate of reflection energy, and then comparing these quantities.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of measuring time dispersion in a signal that has been received from a channel, the method comprising the steps of:

generating a set of received samples from the received signal, wherein the set of received samples corresponds to a known training sequence;

using the known training sequence and the corresponding set of received samples to generate one or more channel estimates;

for each of the one or more channel estimates, determining a corresponding residual energy metric from the corresponding channel estimate, the known training sequence and the corresponding set of received samples;

using the one or more residual energy metrics to estimate received useful energy, C, and reflection energy, R, in the received signal; and comparing the estimated received useful energy and the estimated reflection energy to determine a measure of time dispersion in the signal that has been received from the channel.

2. The method of claim 1, wherein the step of determining the corresponding residual energy metric for each of the one or more channel estimates comprises the steps of:

generating one or more estimates of the received signal, wherein each of the estimates of the received signal corresponds to one of the one or more channel estimates; and determining a corresponding mean squared difference between the estimates of the received signal and the received signal.

3. The method of claim 1, wherein each residual energy metric, $M_L$, is determined in accordance with the following:

$$M_L = \frac{1}{N-2L-1} \sum_{n=L}^{N-1} |\hat{y}(n) - y(n)|^2$$

where $$\hat{y}(n) = \sum_{k=0}^{L} s(n-k)\hat{h}(k), \quad n = L, \ldots, N-1$$

and y(n) is an nth element of the set of received samples, N is the length of the known training sequences, s(n) is an nth element of the known training sequence, $\hat{h}(k)$ is a kth element of the corresponding channel estimate, and L is the memory length of the corresponding channel estimate.

4. The method of claim 3, wherein the estimated received useful energy, C, is determined in accordance with the following equation:

$C = E_{Leq} - QM_{Leq}$, where $$E_{Leq} = \sum_{k=0}^{Leq} |\hat{h}(k)|^2$$

Leq is a predetermined memory length of one of the one or more channel estimates, and Q is a constant.

5. The method of claim 4, wherein the estimated received useful energy is an average value that is generated by determining a value, C, for each of a plurality of bursts in the received signal, and averaging the plurality of generated values C.

6. The method of claim 4, wherein the estimated reflection energy, R, is determined in accordance with the following equation:

$R = \lambda(M_{Leq} - M_{Lext})$ where Lext is a predetermined memory length of an extended one of the one or more channel estimates, Lext>Leq, and λ is a constant.

7. The method of claim 4, wherein the estimated reflection energy, R, is determined in accordance with the following equation:

$$R = \lambda\left(E_{oLext} - \frac{(Lext - Leq)Q}{Lext + 1}M_{Lext}\right)$$

$$E_{oLext} = \sum_{k=Leq+1}^{Lext} |\hat{h}(k)|^2$$

where Lext is a predetermined memory length of an extended one of the one or more channel estimates, Lext>Leq, λ is a constant and Q is a constant.

8. The method of claim 3, wherein the estimated received useful energy, C, is determined in accordance with the following equation:

$$C = E_{iLext} - \frac{(Leq + 1)Q}{Lext + 1}M_{Lext}$$

$$E_{iLext} = \sum_{k=0}^{Leq} |\hat{h}(k)|^2$$

where Lext is a predetermined memory length of an extended one of the one or more channel estimates, Next>Leq, and Q is a constant.

9. The method of claim 8, wherein the estimated received useful energy is an average value that is generated by determining a value, C, for each of a plurality of bursts in the received signal, and averaging the plurality of generated values C.

10. The method of claim 8, wherein the estimated reflection energy, R, is determined in accordance with the following equation:

$R = \lambda(M_{Leq} - M_{Lext})$ where Lext is a predetermined memory length of an extended one of the one or more channel estimates, Lext>Leq, and λ is a constant.

11. The method of claim 8, wherein the estimated reflection energy, R, is determined in accordance with the following equation:

$$R = \lambda\left(E_{oLext} - \frac{(Lext - Leq)Q}{Lext + 1}M_{Lext}\right)$$

$$E_{oLext} = \sum_{k=Leq+1}^{Lext} |\hat{h}(k)|^2$$

where Lext is a predetermined memory length of one of the one or more channel estimates, Lext>Leq, and Q is a constant.

12. The method of claim 3, wherein the estimated reflection energy, R, is determined in accordance with the following equation:

$R = \lambda(M_{Leq} - M_{Lext})$ where Leq is a predetermined memory length of one of the one or more channel estimates, Lext is a predetermined memory length of an extended one of the one or more channel estimates, Lext>Leq, and λ is a constant.

13. The method of claim 12, wherein he estimated reflection energy is an average value that is generated by determining a value, R, for each of a plurality of bursts in the received signal, and averaging the plurality of generated values R.

14. The method of claim 3, wherein the estimated reflection energy, R, is determined in accordance with the following equation:

$$R = \lambda \left( E_{oLext} - \frac{(Lext - Leq)Q}{Lext + 1} M_{Lext} \right)$$

$$E_{oLext} = \sum_{k=Leq+1}^{Lext} |\hat{h}(k)|^2$$

where Leq is a predetermined memory length of one of the one or more channel estimates, and Lext is a predetermined memory length of an extended one of the one or more channel estimates, Lext>Leq, $\lambda$ is a constant and Q is a constant.

15. The method of claim 14, wherein the estimated reflection energy is an average value that is generated by determining a value, R, for each of a plurality of bursts in the received signal, and averaging the plurality of generated values R.

* * * * *